T. M. WILSON.
KILN.
APPLICATION FILED FEB. 20, 1909.

946,087.

Patented Jan. 11, 1910.
8 SHEETS—SHEET 6.

Witnesses
Theo. Rosemann.
J. A. L. Mulhall.

Inventor
Thomas M. Wilson,
By Joshua R. H. Potts
Attorney

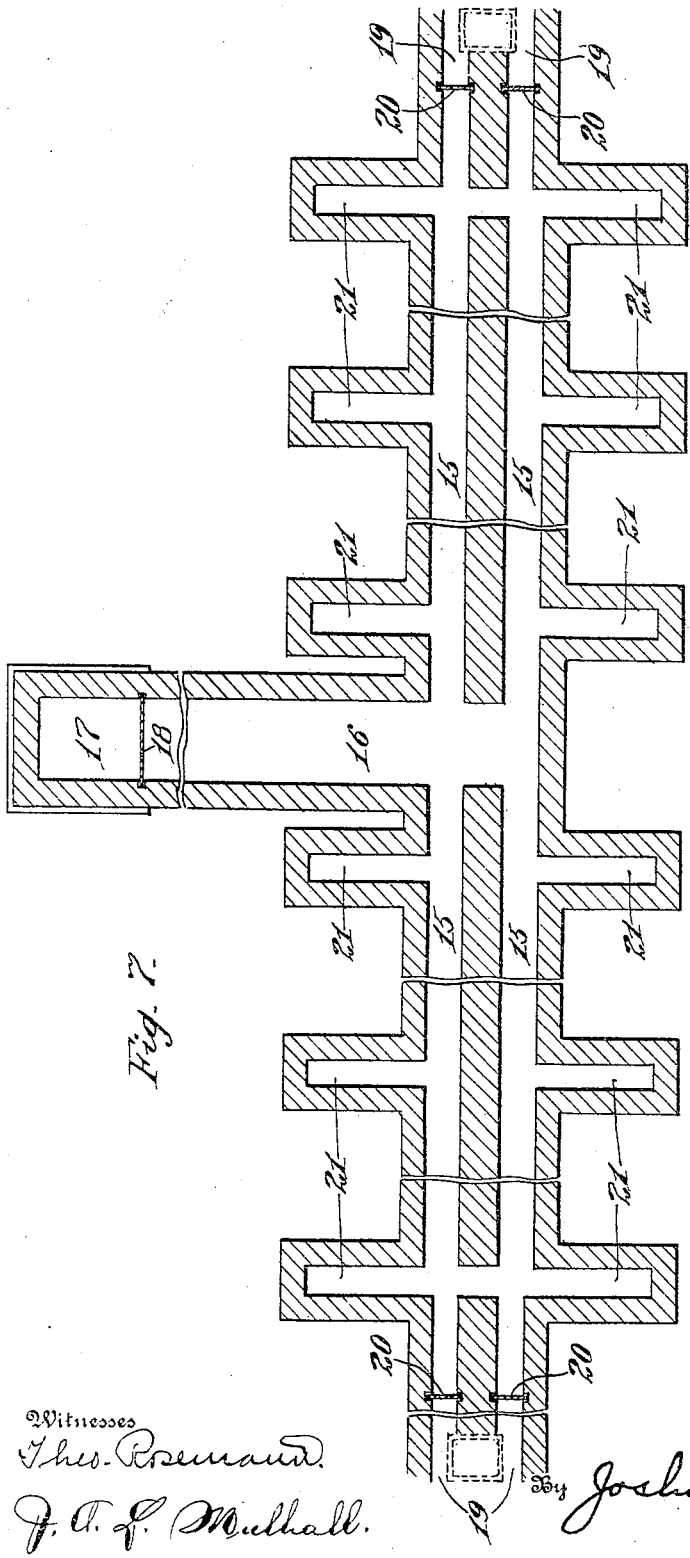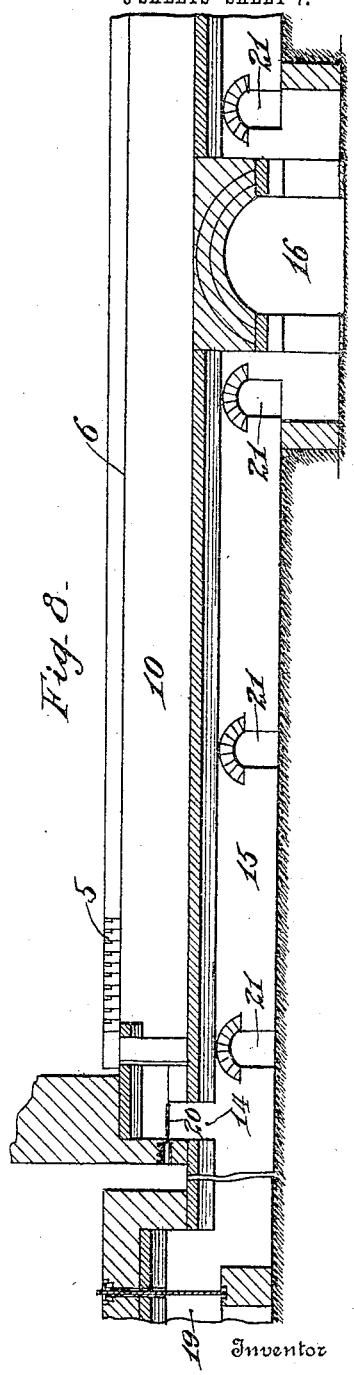

T. M. WILSON.
KILN.
APPLICATION FILED FEB. 20, 1909.

946,087.

Patented Jan. 11, 1910.
8 SHEETS—SHEET 8.

Witnesses
Theo. Rosenaud.
J. A. L. Mulhall.

Inventor
Thomas M. Wilson,
By Joshua R. H. Potts,
Attorney

UNITED STATES PATENT OFFICE.

THOMAS M. WILSON, OF PHILADELPHIA, PENNSYLVANIA.

KILN.

946,087.  Specification of Letters Patent.  Patented Jan. 11, 1910.

Application filed February 20, 1909. Serial No. 479,244.

*To all whom it may concern:*

Be it known that I, THOMAS M. WILSON, a citizen of the United States, residing at Philadelphia, in the county of Philadelphia and State of Pennsylvania, have invented certain new and useful Improvements in Kilns, of which the following is a specification.

My invention relates to improvements in kilns, the object of the invention being to provide an improved arrangement of flues below the kiln floor, which will compel the smoke and gases to move longitudinally and laterally below the floor, and then all pass to a single stack at one side of the kiln.

A further object is to provide an improved arrangement of short longitudinal flues beneath the kiln floor, each series of short longitudinal flues communicating with lateral flues, all of said lateral flues communicating with lateral flues below them to convey the smoke and gases to central longitudinal flues, and the latter communicating with a lateral flue, at the outlet end of which a single stack is provided.

A further object is to provide an improved arrangement of longitudinal flues below the kiln floor, said longitudinal flues connected by lateral flues with vertical passages in the kiln wall, lateral flues connecting said vertical passages with longitudinal flues below the first mentioned longitudinal flues, all of said last mentioned longitudinal flues communicating with a single stack flue, and provide dampers in all of the passages in the kiln walls, so as to regulate the passage of smoke and gases to regulate the heat of the different sections of the kiln, and insure a uniform heat throughout.

With these and other objects in view, the invention consists in certain novel features of construction, and combinations, and arrangement of parts described without departing from my invention, and hence I do not restrict myself to the precise details set forth, but consider myself at liberty to make such changes and alterations as fairly fall within the spirit and scope of my invention.

Figure 1:
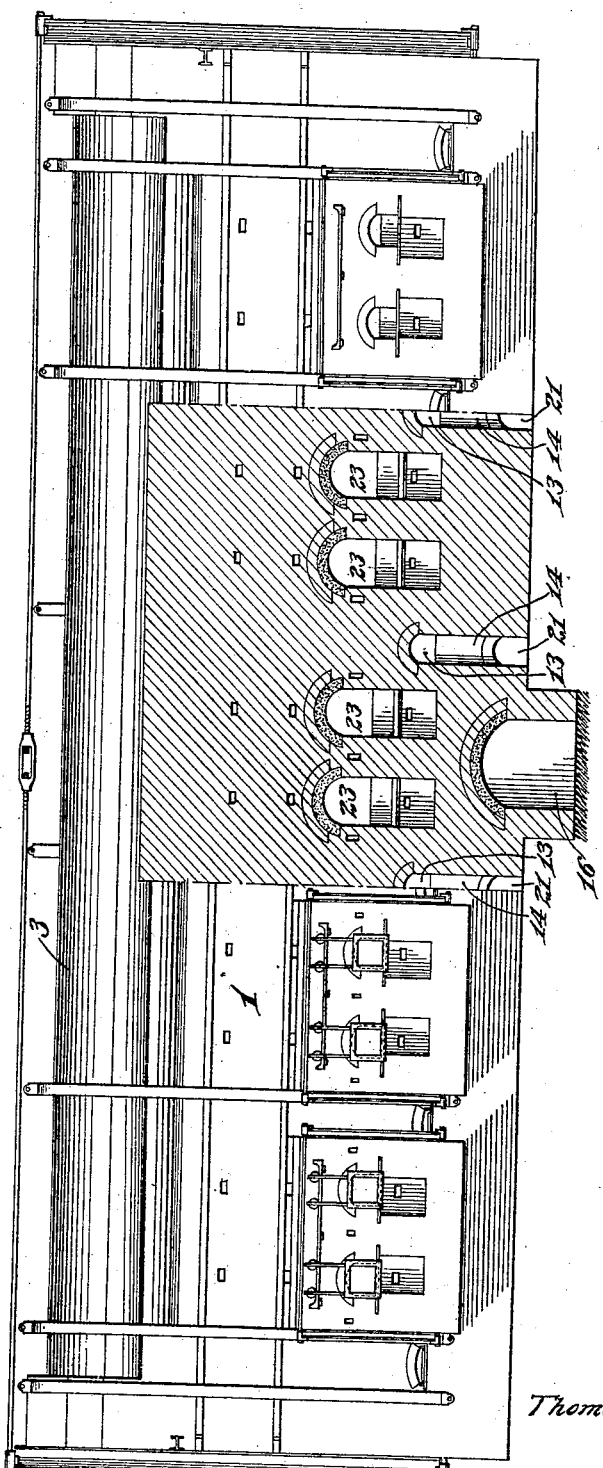
Figure 2:
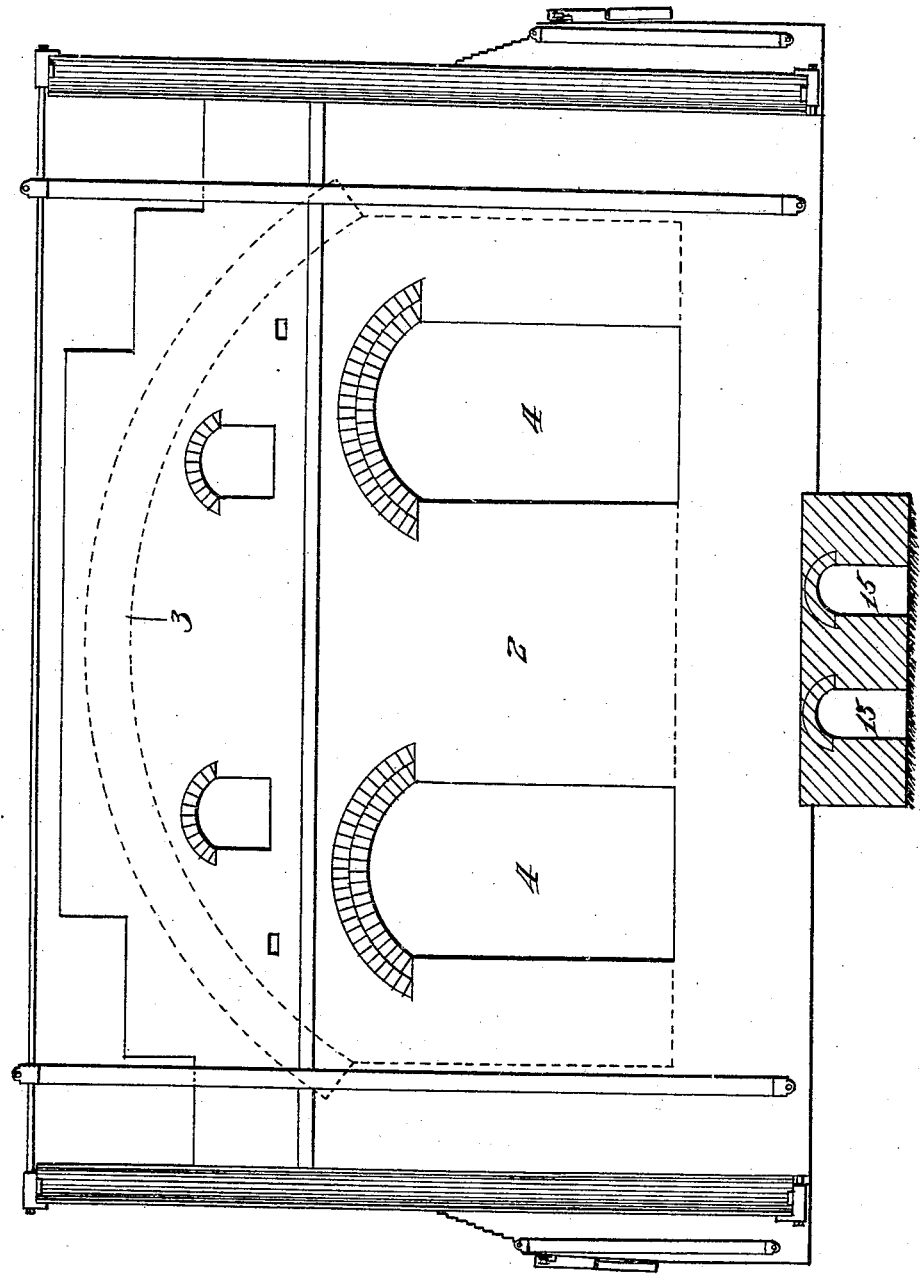
Figure 3:
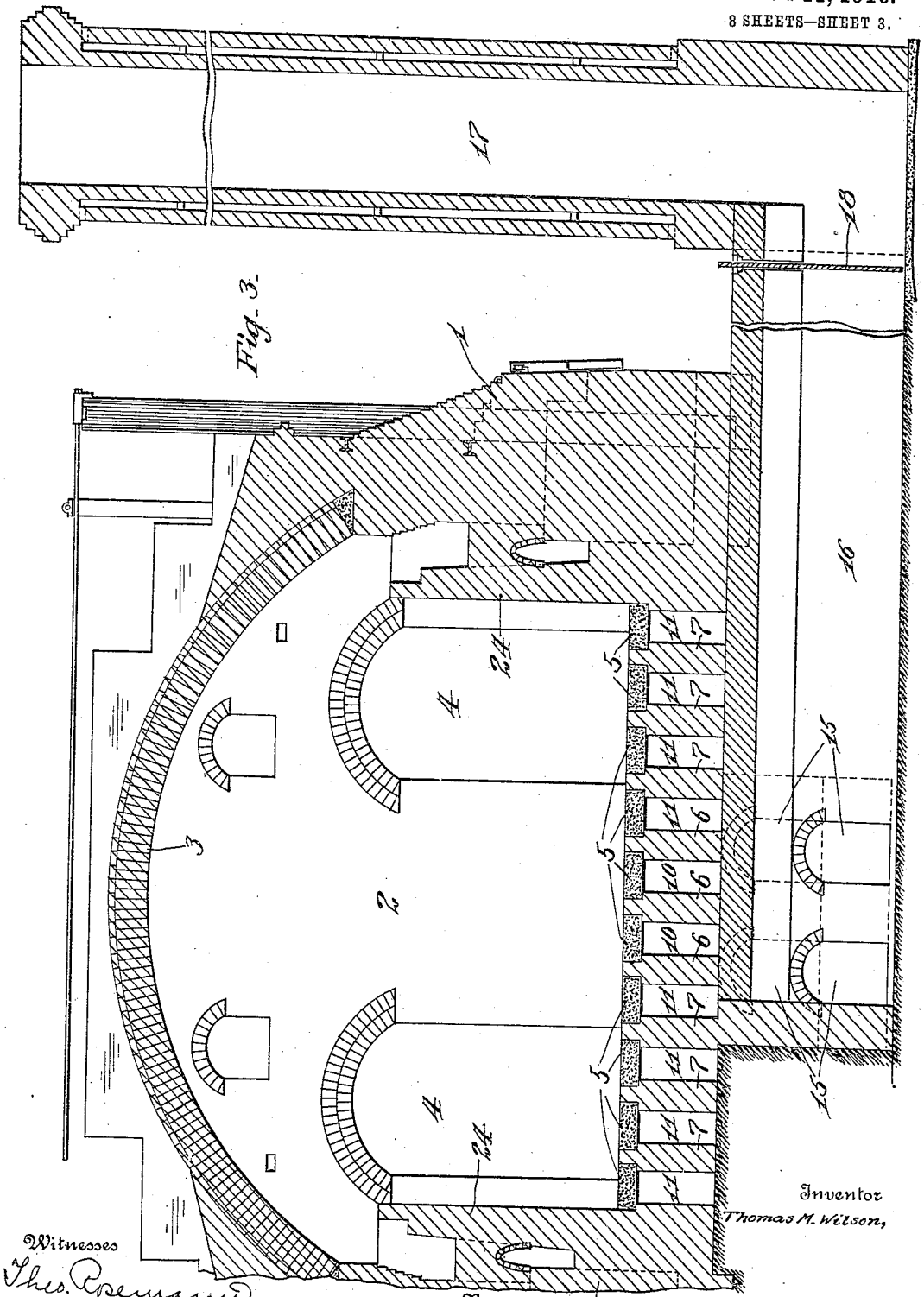
Figure 4:
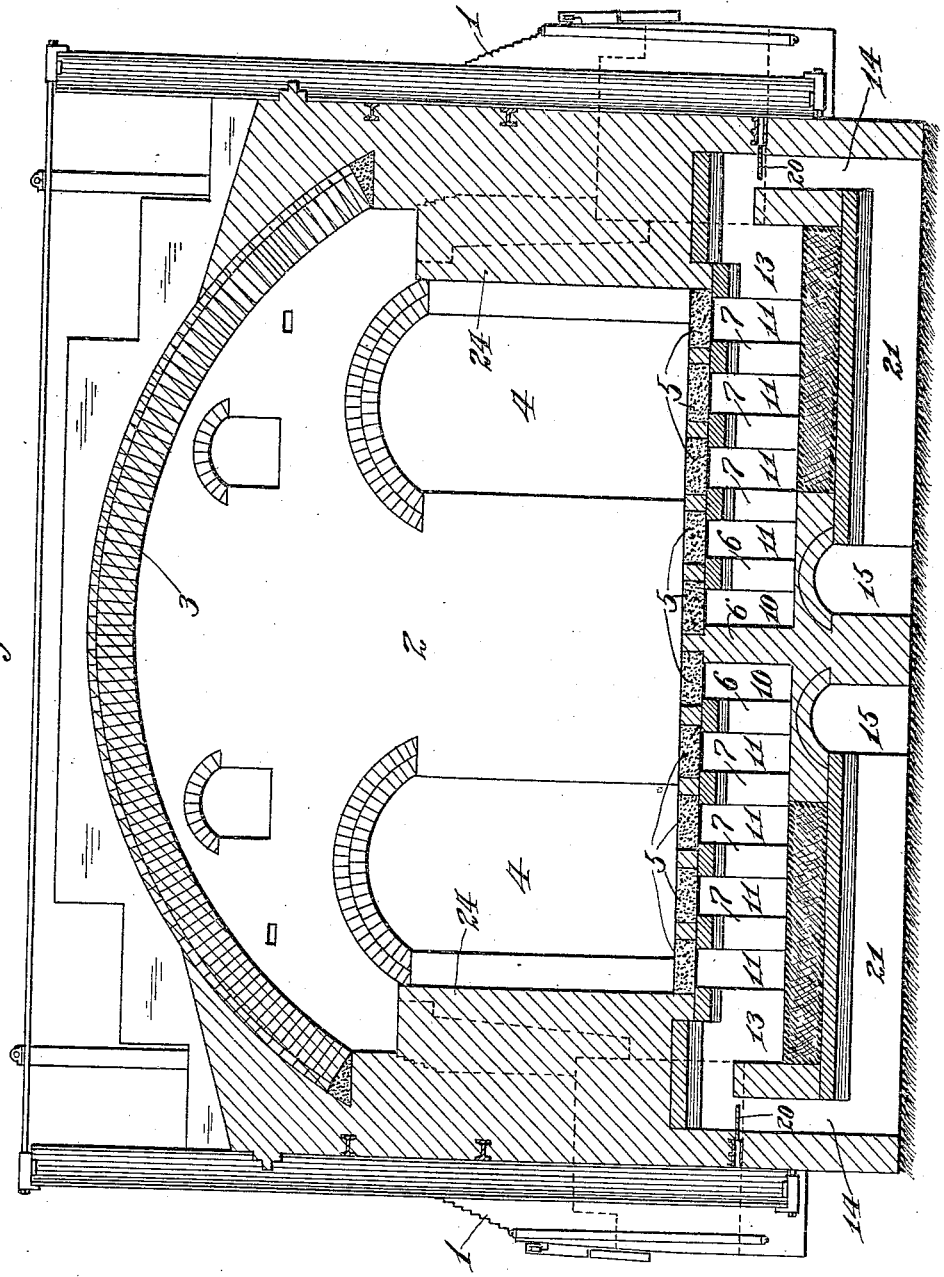
Figure 5:
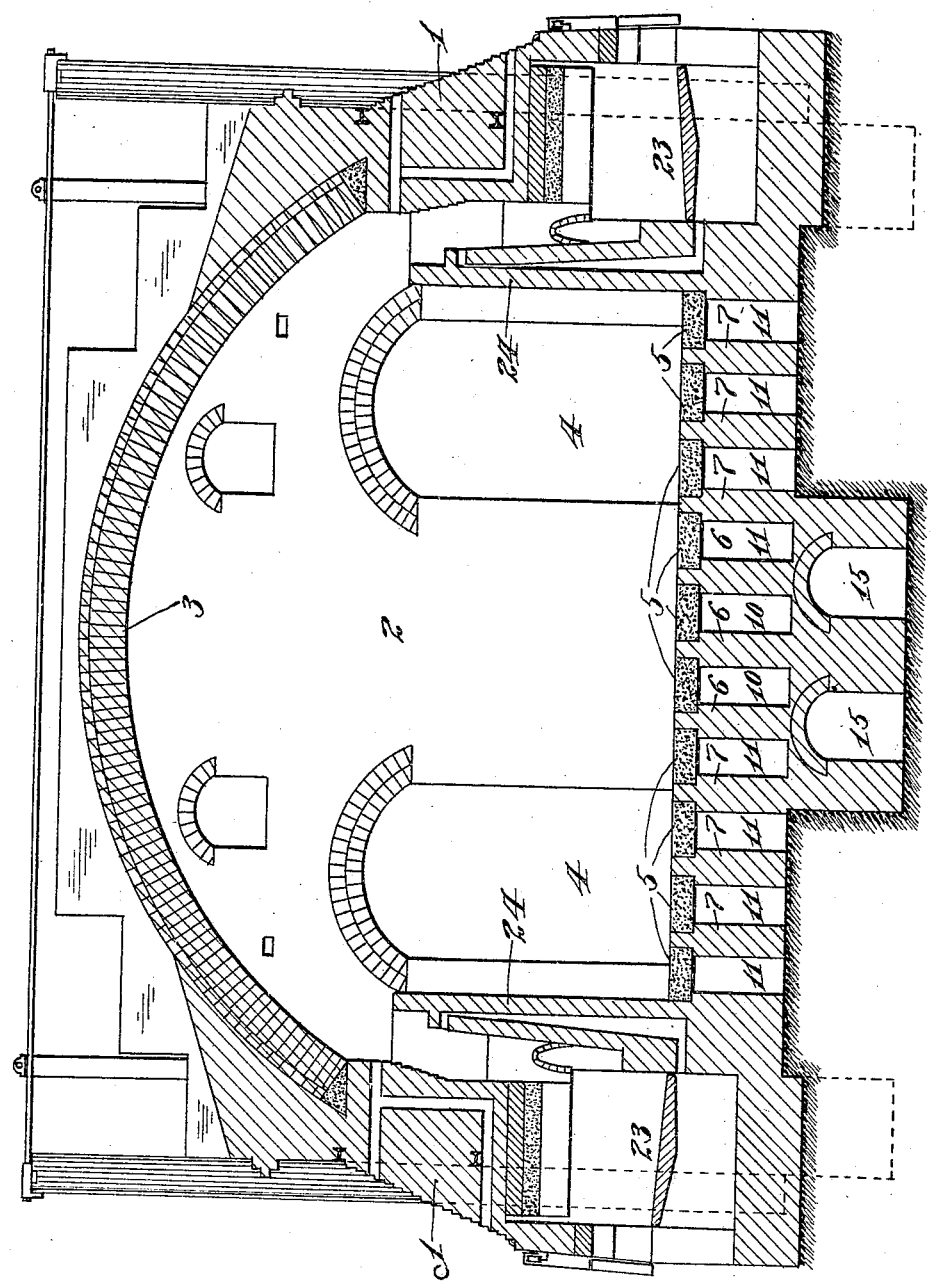
Figure 6:
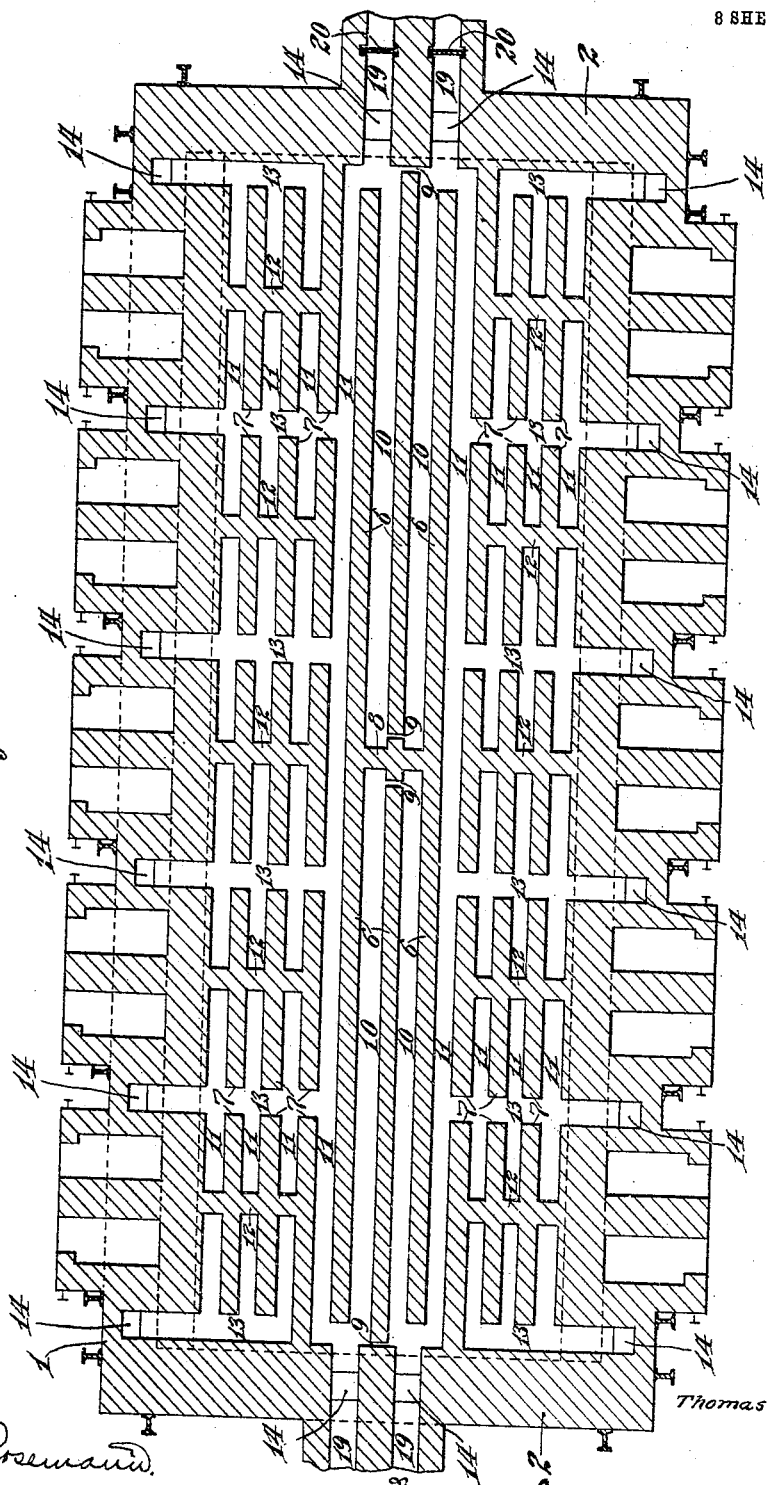
Figure 9:
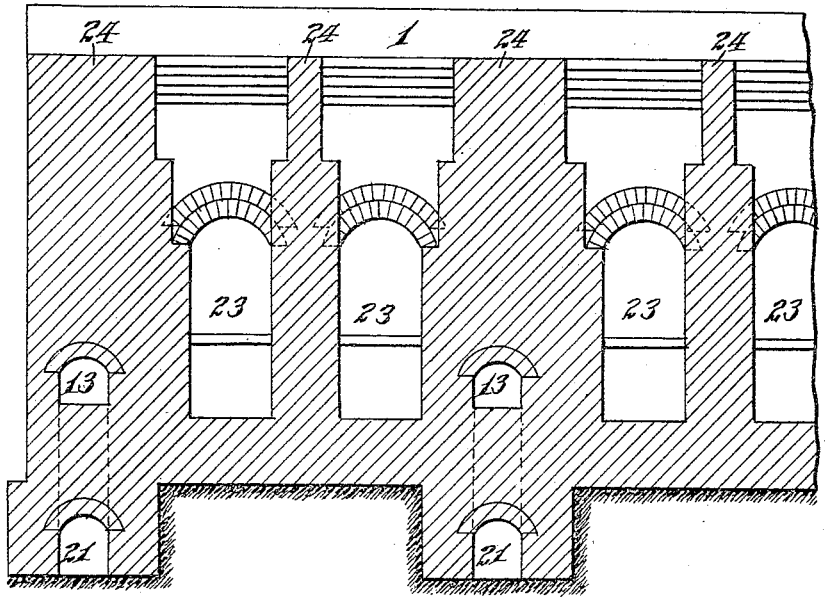
Figure 10:
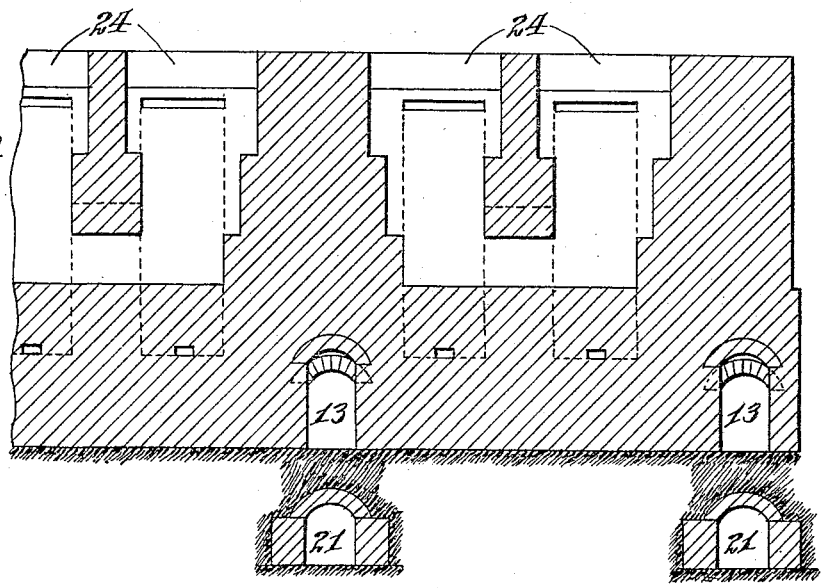

In the accompanying drawings, Figure 1, is a view partly in elevation, partly in longitudinal section through the fire-boxes, and partly dismantled illustrating my improvements. Fig. 2, is a view in end elevation. Fig. 3, is a view in cross section through the center of the kiln. Fig. 4, is a view in cross-section taken at a point through the end lateral flue. Fig. 5, is a view similar to Fig. 4, but taken at a point between the lower lateral flues. Fig. 6, is a plan view taken in horizontal section through the chords below the kiln floor. Fig. 7, is a view similar to Fig. 6, but taken through the lowest flue. Fig. 8, is a fragmentary view in longitudinal section through the center of the kiln illustrating the arrangement of flues below the kiln floor. Fig. 9, is an inside face view of the kiln wall taken from a point between the bridge wall of the kiln, and Fig. 10, is a view similar to Fig. 9, but taken at a point inside of the kiln and looking at the bridge wall.

1 represents the side walls of my improved kiln, 2 the end walls, and 3 the arch connecting the side walls constituting a roof for the kiln. The ends of the kiln are provided with entrances 4 to admit the workmen in charging and emptying the kiln, it being of course understood that these entrances are sealed during the burning operation.

5 represents the kiln floor which is composed of fire brick, having spaces between them, constituting an open work structure, through which the smoke and gases can freely pass to the flues below. The floor brick are supported upon longitudinal chords 6 and 7 respectively, the chords 6 being long, extending approximately through the length of the kiln and located at the center. Three of these long chords 6 are shown, the two outside chords connected by a cross chord 8 at their center, and the center chord broken at the points 9, to allow for expansion and contraction thereof. This central chord is longer than the two other chords 6, so that the flues 10 provided between said chords communicate with the flues 11 between the shorter chords, so the smoke and gases which pass into these flues 9 may pass around the ends of the outside chord 6, and into the flues 10, or directly into passages 14 in the end walls, as will be hereinafter described. The inner shorter chords 7 at the ends of the kiln, and adjacent to the chords 6, connect with the end walls of the kiln, so as to compel the smoke and gases from the flues 9 to pass backward toward the center of the kiln, as will be readily understood, especially by reference to Fig. 6. The shorter chords 7 are arranged in units of three chords each, having a central cross chord 12 connecting them with the side walls of the kiln, and as the ends of the respective units or series of short chords 7 are spaced apart or are arched over, so as to support the floor brick, they provide a series of laterally extending flues 13 communicating with vertical passages 14 in the walls of the furnace.

Below the above described flues, and extending throughout the longitudinal center of the kiln, parallel longitudinal flues 15 are provided, both of which communicate with a cross flue 16, the latter connecting with a stack 17, a suitable damper 18 being provided in this flue 16, to be closed when the waste heat is being drawn from the kiln and permit this drawing off of the waste heat and its use in connection with any desired drier. Dampered flues 19 connect with the ends of the flues 15 as clearly shown in Fig. 8, and all of the passages 14 are provided with dampers 20, to control the passage of smoke and gases.

All of the vertical passages 14 in the side walls of the kiln are connected by lateral flues 21 with the longitudinal flues 15, the said flues 21 being at a lower level than are the flues 13, and the passages 14 in the end walls of the kiln, connect the ends of flues 10 directly with the longitudinal flues 15, so that all of the smoke and gases which will pass into the flues 10 may pass directly into the passages 14 in the end walls of the kiln, thence through the longitudinal flues 15 to lateral flue 16, and up the stack, while the smoke and gases which pass into the flues 11 will move through the lateral flues 13 to the passage 14 in the side walls of the kiln, thence down into the lateral flues 21, through the same to the longitudinal flues 15 and through said flues 15 to the lateral flue 16 and up the stack. By this arrangement of flues, should any portion of the kiln not receive its proper quota of heat, the dampers 20 may be moved, so as to close certain of the passages 14, which are receiving more than their proper portion of the smoke and gases, and hence compel the smoke and gases to pass through the neglected portion of the kiln, and by this manipulation of the dampers 20, a uniform distribution of the heat throughout the kiln is assured.

In the side walls 1 of the kiln, at points between vertical passages 14, furnaces are provided and comprise twin fire-boxes 23. These furnaces are constructed precisely as are the furnaces described and claimed in my application for patent executed on even date herewith, and hence need not here be described in detail, save to say, that the smoke and gases from said furnaces pass upward over the longitudinal bridge walls 24 into the kiln, thence down through the open work floor 5 into the flues as above explained.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a kiln, the combination with a perforated floor, of two longitudinal parallel flues below the center of the kiln floor, several series of short longitudinal flues at both sides of the center flues, short lateral flues communicating with the respective series of short longitudinal flues, vertical passages in the end and side walls of the kiln, the end passages communicating with the long longitudinal flues and the side passages with the short lateral flues, longitudinal flues below the first mentioned longitudinal flues and communicating with the passages in the end walls, lateral flues below the first mentioned lateral flues and connecting the passages in the side walls with the lower longitudinal flues, a stack, and a single flue connecting the lower longitudinal flues with said stack.

2. In a kiln, the combination with a perforated floor, of two longitudinal parallel flues below the center of the kiln floor, several series of short longitudinal flues at both sides of the center flues, short lateral flues communicating with the respective series of short longitudinal flues, vertical passages in the end and side walls of the kiln, the end passages communicating with the long longitudinal flues and the side passages with the short lateral flues, longitudinal flues below the first mentioned longitudinal flues and communicating with the passages in the end walls, lateral flues below the first mentioned lateral flues and connecting the passages in the side walls with the lower longitudinal flue, a stack, and a single flue connecting the lower longitudinal flues with said stack, a damper in said last mentioned lateral flue, and dampers in all of said passages in the kiln walls.

3. In a kiln, the combination with a perforated floor, of parallel longitudinal flues at the center of the kiln below the floor, several series of short longitudinal flues on both sides of the center longitudinal flues, lateral flues connecting said short longitudinal flues, lower longitudinal and lateral flues parallel with the upper flues, vertical passages in the end and side walls of the kiln with which said central longitudinal and said lateral flues communicate, longitudinal flues below the first mentioned flues and communicating with the passages in the end wall of the kiln, lateral flues connecting the passages in the side walls of the kiln with said last mentioned longitudinal flues, and a stack flue communicating with said last mentioned longitudinal flue.

4. In a kiln, the combination with a perforated floor, of two longitudinal parallel flues below the center of the kiln floor, several series of short longitudinal flues at both sides of the center flues, short lateral flues communicating with the respective series of short longitudinal flues, vertical passages in the end and side walls of the kiln, the end passages communicating with the long longitudinal flues and the side passages with the short lateral flues, longitudinal flues below and parallel with the first mentioned longitudinal flues and communicating with the passages in the end walls, lateral flues below and parallel with the first mentioned lateral flues and connecting the passages in the side walls with the lower longitudinal flues, a stack, and a single flue connecting the lower longitudinal flues with said stack.

5. In a kiln, the combination with a perforated floor, of two longitudinal parallel flues below the center of the kiln floor, several series of short longitudinal flues at both sides of the center flues, short lateral flues communicating with the respective series of short longitudinal flues, vertical passages in the end and side walls of the kiln, the end passages communicating with the long longitudinal flues and the side passages with the short lateral flues, longitudinal flues below and parallel with the first mentioned longitudinal flues and communicating with the passages in the end walls, lateral flues below and parallel with the first mentioned lateral flues and connecting the passages in the side walls with the lower longitudinal flues, a stack, and a single flue connecting the lower longitudinal flues with said stack, a damper in said last mentioned lateral flue, and dampers in all of said passages in the kiln walls.

6. In a kiln, the combination with a perforated floor, of two longitudinal parallel flues below the center of the kiln floor, several series of short longitudinal flues at both sides of the center flues, short lateral flues communicating with the respective series of short longitudinal flues, said center longitudinal flues communicating at their ends with the shorter longitudinal and the lateral flues, vertical passages in the end and side walls of the kiln, the end passages communicating with the long longitudinal flues and the side passages with the short lateral flues, longitudinal flues below the first mentioned lateral flues and connecting the passages in the side walls with the lower longitudinal flues, a stack, and a single flue connecting the lower longitudinal flues with said stack.

7. In a kiln, the combination with a perforated floor, of two longitudinal parallel flues below the center of the kiln floor, several series of short longitudinal flues at both sides of the center flues, short lateral flues communicating with the respective series of short longitudinal flues, said center longitudinal flues communicating at their ends with the shorter longitudinal and the lateral flues, vertical passages in the end and side walls of the kiln, the end passages communicating with the long longitudinal flues and the side passages with the short lateral flues, longitudinal flues below the first mentioned longitudinal flues and communicating with the passages in the end walls, lateral flues below the first mentioned lateral flues and connecting the passages in the side walls with the lower longitudinal flue, a stack, and a single flue connecting the lower longitudinal flues with said stack, a damper in said last mentioned lateral flue, and dampers in all of said passages in the kiln walls.

8. In a kiln, the combination with a perforated floor, of parallel longitudinal flues at the center of the kiln below the floor, several series of short longitudinal flues on both sides of the center longitudinal flues, lateral flues connecting said short longitudinal flues, lower longitudinal and lateral flues parallel with the upper flues, the upper center longitudinal flues communicating at their ends with the short longitudinal and upper lateral flues, vertical passages in the end and side walls of the kiln with which said central longitudinal and said lateral flues communicate, longitudinal flues below the first mentioned flues and communicating with the passages in the end wall of the kiln, lateral flues connecting the passages in the side walls of the kiln with said last mentioned longitudinal flues, and a stack flue communicating with said last mentioned longitudinal flue.

9. In a kiln, the combination with a perforated floor, of two longitudinal parallel flues below the center of the kiln floor, several series of short longitudinal flues at both sides of the center flues, short lateral flues communicating with the respective series of short longitudinal flues, said center longitudinal flues communicating at their ends with the shorter longitudinal and the lateral flues, vertical passages in the end and side walls of the kiln, the end passages communicating with the long longitudinal flues and the side passages with the short lateral flues, longitudinal flues below and parallel with the first mentioned longitudinal flues and communicating with the passages in the end walls, lateral flues below and parallel with the first mentioned lateral flues and connecting the passages in the side walls with the lower longitudinal flues, a stack, and a single flue connecting the lower longitudinal flues with said stack.

10. In a kiln, the combination with a perforated floor, of two longitudinal parallel flues below the center of the kiln floor, several series of short longitudinal flues at both sides of the center flues, short lateral flues communicating with the respective series of short longitudinal flues, said center longitudinal flues communicating at their ends with the shorter longitudinal and the lateral flues, vertical passages in the end and side walls of the kiln, the end passages communicating with the long longitudinal flues and the side passages with the short lateral flues, longitudinal flues below and parallel with the first mentioned longitudinal flues and communicating with the passages in the end walls, lateral flues below and parallel with the first mentioned lateral flues and connecting the passages in the side walls with the lower longitudinal flues, a stack, and a single flue connecting the lower longitudinal flues with said stack, a damper in said last mentioned lateral flue, and dampers in all of said passages in the kiln walls.

In testimony whereof I have signed my name to this specification in the presence of two subscribing witnesses.

THOMAS M. WILSON.

Witnesses:
R. H. KRENKEL,
J. A. L. MULHALL.